(12) United States Patent
Masuda et al.

(10) Patent No.: US 9,810,142 B2
(45) Date of Patent: Nov. 7, 2017

(54) UNIFLOW-SCAVENGING-TYPE TWO-CYCLE ENGINE

(71) Applicant: IHI Corporation, Tokyo (JP)

(72) Inventors: Yutaka Masuda, Tokyo (JP); Takayuki Yamada, Tokyo (JP); Takayuki Hirose, Tokyo (JP); Takahiro Kuge, Tokyo (JP); Takeshi Yamada, Tokyo (JP)

(73) Assignee: IHI CORPORATION, Tokyo (JP)

( * ) Notice: Subject to any disclaimer, the term of this patent is extended or adjusted under 35 U.S.C. 154(b) by 148 days.

(21) Appl. No.: 14/634,113

(22) Filed: Feb. 27, 2015

(65) Prior Publication Data

US 2015/0176475 A1 Jun. 25, 2015

Related U.S. Application Data

(63) Continuation of application No. PCT/JP2013/073188, filed on Aug. 29, 2013.

(30) Foreign Application Priority Data

Aug. 31, 2012 (JP) ................... 2012-191120

(51) Int. Cl.
*F02B 25/00* (2006.01)
*F02B 25/02* (2006.01)
(Continued)

(52) U.S. Cl.
CPC .......... *F02B 25/02* (2013.01); *F02B 7/08* (2013.01); *F02B 25/04* (2013.01); *F02D 19/10* (2013.01);
(Continued)

(58) Field of Classification Search
USPC ....................................... 123/74 R
See application file for complete search history.

(56) References Cited

U.S. PATENT DOCUMENTS 3,003,755 A 10/1961 Péras
3,572,298 A * 3/1971 Onishi .................. F02B 17/005
123/301
(Continued)

FOREIGN PATENT DOCUMENTS

CN 101151444 A 3/2008
DE 44 07 360 A1 9/1995
(Continued)

OTHER PUBLICATIONS

Machine Translation of JP2001027170A PDF File Name: "JP2001027170A_Machine_Translation.pdf".*

(Continued)

*Primary Examiner* — Carlos A Rivera
*Assistant Examiner* — Ruben Picon-Feliciano
(74) *Attorney, Agent, or Firm* — Rothwell, Figg, Ernst & Manbeck, P.C.

(57) ABSTRACT

A uniflow-scavenging-type two-cycle engine includes: a cylinder; a piston that slides in the cylinder; an exhaust port that is provided at a first end of the cylinder; an exhaust valve that opens and closes the exhaust port; a scavenging port that is provided in an inner circumferential surface of a second end of the cylinder in the stroke direction of the piston and inhales an active gas into a combustion chamber in accordance with a sliding movement of the piston; a plurality of fuel injection valves that inject a fuel gas to the active gas, which has been drawn in from the scavenging port to the combustion chamber, to thereby generate a premixed gas; and a fuel injection control unit that varies injection directions of fuel gas injected from a part or all of the fuel injection valves.

4 Claims, 7 Drawing Sheets

(51) Int. Cl.

| | | |
|---|---|---|
| *F02D 41/30* | (2006.01) | |
| *F02B 25/04* | (2006.01) | |
| *F02M 21/02* | (2006.01) | |
| *F02B 7/08* | (2006.01) | |
| *F02D 41/32* | (2006.01) | |
| *F02D 41/34* | (2006.01) | |
| *F02D 41/00* | (2006.01) | |
| *F02D 19/10* | (2006.01) | |
| *F02D 41/38* | (2006.01) | |
| *F02B 75/02* | (2006.01) | |

(52) U.S. Cl.
CPC ..... *F02D 41/0027* (2013.01); *F02D 41/3094* (2013.01); *F02D 41/32* (2013.01); *F02D 41/34* (2013.01); *F02M 21/0275* (2013.01); *F02M 21/0281* (2013.01); *F02M 21/0284* (2013.01); *F02B 2075/025* (2013.01); *F02D 2041/389* (2013.01); *F02D 2250/08* (2013.01); *F02D 2400/04* (2013.01); *Y02T 10/32* (2013.01); *Y02T 10/36* (2013.01); *Y02T 10/44* (2013.01)

(56) References Cited

U.S. PATENT DOCUMENTS

| | | |
|---|---|---|
| 3,646,924 A | 3/1972 | Newkirk et al. |
| 8,972,151 B2 | 3/2015 | Hirose et al. |
| 2006/0219213 A1 | 10/2006 | Lemke |
| 2013/0133624 A1 | 5/2013 | Hirose et al. |
| 2015/0075485 A1 | 3/2015 | Yamada et al. |
| 2015/0167537 A1 | 6/2015 | Masuda et al. |
| 2015/0167538 A1 | 6/2015 | Masuda et al. |
| 2015/0260115 A1 | 9/2015 | Masuda et al. |
| 2016/0061097 A1 | 3/2016 | Kuge et al. |
| 2016/0061098 A1 | 3/2016 | Kuge et al. |
| 2016/0061099 A1 | 3/2016 | Kuge et al. |

FOREIGN PATENT DOCUMENTS

| | | | |
|---|---|---|---|
| EP | 2 634 398 A1 | | 9/2013 |
| JP | 150218 | | 4/1942 |
| JP | 61-99671 U | | 6/1986 |
| JP | 61-197757 A | | 9/1986 |
| JP | 61197757 A | * | 9/1986 |
| JP | 2-55624 B2 | | 11/1990 |
| JP | 10-318016 A | | 12/1998 |
| JP | 2001-27170 A | | 1/2001 |
| JP | 2001027170 A | * | 1/2001 |
| JP | 2004-353514 A | | 12/2004 |
| JP | 2012-77742 A | | 4/2012 |
| JP | 2012-154188 A | | 8/2012 |
| JP | 2012-154189 A | | 8/2012 |
| KR | 10-0405784 B1 | | 11/2003 |
| WO | 2012/018071 A1 | | 2/2012 |
| WO | 2012/057310 A1 | | 5/2012 |

OTHER PUBLICATIONS

Machine Translation of JP61197757A PDF File Name: "JP61197757A_Machine_Translation.pdf".*
International Search Report dated Sep. 24, 2013 in PCT/JP2013/073188 (2 pages).
Japanese Office Action dated Mar. 29, 2016 in corresponding Japanese Application No. 2012-191120 including English translation (7 pages).

* cited by examiner

UNIFLOW-SCAVENGING-TYPE TWO-CYCLE ENGINE

CROSS REFERENCE TO RELATED DOCUMENTS

This application is a continuation application based on a PCT Patent Application No. PCT/JP2013/073188, filed Aug. 29, 2013, whose priority is claimed on Japanese Patent Application No. 2012-191120, filed Aug. 31, 2012. The contents of both the PCT application and the Japanese Patent Application are incorporated herein by reference.

TECHNICAL FIELD

The present invention relates to a uniflow-scavenging-type two-cycle engine for burning a premixed gas that is generated by injecting a fuel gas to an active gas drawn in from scavenging ports.

BACKGROUND ART

For example, as shown in Patent Document 1, a uniflow-scavenging-type two-cycle engine (two-stroke engine) used also for an engine of a ship has an exhaust port provided at a first end of its cylinder in the stroke direction of its piston and has scavenging ports provided at a second end of its cylinder in the stroke direction of its piston. When, in the intake (induction) process, an active gas is drawn in from the scavenging ports to a combustion chamber, an exhaust gas generated by the combustion action is exhausted, as if being pushed out, by the drawn in active gas.

At this time, a premixed gas is generated by injecting a fuel gas to the drawn in active gas, and the generated premixed gas is compressed. Then, in the compressed premixed gas, a pilot fuel is injected, to thereby obtain a combustion action of the premixed gas ignited by the combustion of the pilot fuel. With an explosive pressure generated by the combustion action, the piston reciprocates in the cylinder. To achieve this, the cylinder is provided with a fuel injection valve that injects a fuel gas. However, in two-cycle engines with a large diameter such as two-cycle engines for ships, a plurality of fuel injection valves are provided in the circumferential direction of the cylinder, and the fuel gas is injected simultaneously from the fuel injection valves.

DOCUMENT OF RELATED ART

Patent Document

Patent Document 1: Japanese Unexamined Patent Application, First Publication No. 2012-77742

However, in the conventional two-cycle engines provided with a plurality of fuel injection valves, there are cases where it is not possible to spread a fuel gas widely over the whole internal area of the cylinder because the fuel gas is injected toward the center of the cylinder from all the fuel injection valves. If, in the two-cycle engines, a fuel gas can be spread widely over the whole internal area of the cylinder, then it is possible to further improve the operational performance. Therefore, further improvement in how to inject a fuel gas is desired.

SUMMARY OF INVENTION

Technical Problem

Therefore, the present invention has an object to provide a uniflow-scavenging-type two-cycle engine that, with the structure of fuel injection valves being modified, is capable of spreading a fuel gas widely over the whole internal area of a cylinder, to thereby make it possible to further improve the operational performance.

Solution to Problem

A uniflow-scavenging-type two-cycle engine according to the present invention includes: a cylinder in which a combustion chamber is formed; a piston that slides in the cylinder; an exhaust port that is provided at a first end of the cylinder in a stroke direction of the piston; an exhaust valve that opens and closes the exhaust port; a scavenging port that is provided in an inner circumferential surface of a second end of the cylinder in the stroke direction of the piston and inhales an active gas into the combustion chamber in accordance with a sliding movement of the piston; a plurality of fuel injection valves that inject a fuel gas to the active gas, which has been drawn in from the scavenging port to the combustion chamber, to thereby generate a premixed gas; and a fuel injection control unit that varies injection directions of fuel gas injected from part or all of the fuel injection valves.

Furthermore, the uniflow-scavenging-type two-cycle engine according to the present invention may further include: a load determination unit that determines whether the uniflow-scavenging-type two-cycle engine is in a high-load state or in a low-load state, wherein if a load state detected by the load determination unit is the high-load state, then the fuel injection control unit turns the injection directions of the fuel gas to first directions, which are directions along a swirl flow of the active gas drawn in into the cylinder; and if a load state detected by the load determination unit is the low-load state, then the fuel injection control unit turns the injection directions of the fuel gas to second directions, which are directions closer to a central axis of the cylinder than the first directions.

Furthermore, the uniflow-scavenging-type two-cycle engine according to the present invention may further include: a blow-by detection unit that detects an amount of blow-by of the fuel gas from the exhaust port, wherein if the amount of blow-by of the fuel gas detected by the blow-by detection unit is not less than a threshold value, then fuel injection control unit turns the injection directions of the fuel gas to directions closer to the scavenging port in the stroke direction of the piston than if the amount of blow-by of the fuel gas is less than the threshold value.

As for the fuel injection valves, a cross-sectional area of flow passage may be variable somewhere in a flow passage from an internal area of the fuel injection valve to an injection outlet through which the fuel gas flows.

Effects of the Invention

According to the uniflow-scavenging-type two-cycle engine of the present invention, with the structure of fuel injection valves being modified, it is possible to spread a fuel gas widely over the whole internal area of a cylinder, to thereby make it possible to further improve the operational performance.

DESCRIPTION OF EMBODIMENTS

Hereunder is a detailed description of a preferred embodiment of the present invention with reference to the appended drawings. The dimensions, materials, specific numerical values, and the like shown in the embodiment of the present invention are merely examples for making the understanding of the invention easy, and hence, do not limit the present invention unless otherwise specified. In the present specification and the drawings, elements with substantially the same function or structure are denoted by the same reference symbols, and are not repetitiously explained. Furthermore, illustrations of those elements that are not directly related to the present invention are omitted.

Figure 1:
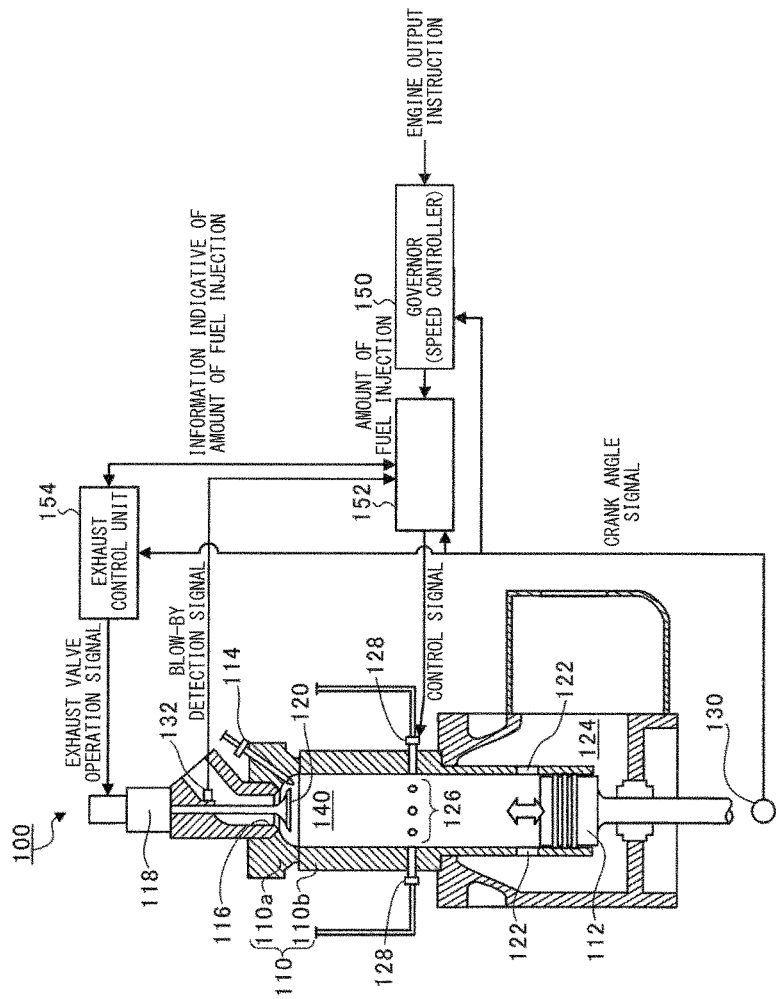
FIG. 1 is an explanatory diagram showing a general structure of a uniflow-scavenging-type two-cycle engine.

FIG. 1 is an explanatory diagram showing a general structure of a uniflow-scavenging-type two-cycle engine 100. The uniflow-scavenging-type two-cycle engine 100 of the present embodiment is used for, for example, ships or the like. To be more specific, the uniflow-scavenging-type two-cycle engine 100 includes: a cylinder 110 (a cylinder head 110a, a cylinder block 110b); a piston 112; a pilot injection valve 114; an exhaust port 116; an exhaust valve drive device 118; an exhaust valve 120; scavenging ports 122; a scavenging room 124; fuel injection ports 126; fuel injection valves 128; a rotary encoder 130; a blow-by detection unit 132; and a combustion chamber 140, and is controlled by control units such as a governor (speed controller) 150, a fuel injection control unit 152, and an exhaust control unit 154.

In the uniflow-scavenging-type two-cycle engine 100, the piston 112, which is coupled to a crosshead (not shown in the figure), reciprocates slidably in the cylinder 110 through four sequential processes of: intake (induction), compression, combustion, and exhaust. In this crosshead-type piston 112, it is possible to form a stroke in the cylinder 110 comparatively long, and to cause the crosshead to receive a lateral pressure acting on the piston 112. Therefore, it is possible to obtain a high-power output of the uniflow-scavenging-type two-cycle engine 100. Furthermore, because the cylinder 110 and a crank room (not shown in the figure) in which the crosshead is contained are separated from each other, it is possible to prevent deterioration due to contamination even when low-grade fuel oil is used.

The pilot injection valve 114 is provided in the cylinder head 110a above a top dead center of the piston 112, which is a first end of the cylinder 110 in the stroke direction. The pilot injection valve 114 injects a proper amount of fuel oil at a desired time in the engine cycle. The fuel oil is spontaneously ignited by the heat of the combustion chamber 140, which is surrounded by the cylinder head 110a, the cylinder liner of the cylinder block 110b, and the piston 112, and burns in a short amount of time, to thereby raise the combustion chamber 140 extremely high in temperature. Therefore, it is possible to securely ignite and burn the premixed gas including the fuel gas at a desired time.

The exhaust port 116 is an opening provided at the first end of the cylinder 110 in the stroke direction of the piston 112, namely, at the top of the cylinder head 110a above the top dead center of the piston 112. The exhaust port 116 is opened and closed for exhausting the exhaust gas after combustion that has been generated in the cylinder 110. The exhaust valve drive device 118 slides the exhaust valve 120 up and down at predetermined times to open and close the exhaust port 116. Thus, the exhaust gas exhausted via the exhaust port 116 is exhausted to the outside after, for example, it is supplied to the turbine of the supercharger (not shown in the figure).

The scavenging ports 122 are openings provided in an inner circumferential surface (inner circumferential surface of the cylinder block 110b) at a second end of the cylinder 110 in the stroke direction of the piston 112. The scavenging ports 122 inhale an active gas into the cylinder 110 in accordance with the sliding movement of the piston 112. The active gas includes oxygen, oxidant such as ozone, or mixture gas of these (air, for example). The scavenging room 124 is filled with an active gas (air, for example) that has been pressurized by the compressor of a supercharger (not shown in the figure). With a difference in pressure between the scavenging room 124 and the cylinder 110, the active gas is drawn in from the scavenging ports 122. The pressure of the scavenging room 124 may be substantially constant. However, if the pressure of the scavenging room 124 changes, the scavenging ports 122 may be provided with a pressure gauge, and other parameters such as an amount of injection of the fuel gas may be controlled in accordance with the measured value.

The fuel injection ports 126 are a plurality of (eight, in the present embodiment) openings provided in a manner spaced from each other with a predetermined distance in a substantially circumferential direction (not only in the exact circumferential direction but displacement in the stroke direction is allowed) in the inner circumferential surface of the cylinder 110 (between the exhaust port 116 and the scavenging ports 122).

Each fuel injection valve 128 is arranged in each fuel injection port 126. On receiving an instruction from the fuel injection control unit 152, the fuel injection valve 128 injects a fuel gas that is, for example, a gasified LNG (liquefied natural gas). Thus, a fuel gas is supplied to the internal area of the cylinder 110. The fuel gas is not limited to LNG, but a gasified version of, for example, LPG (liquefied petroleum gas), light oil, heavy oil, or the like may be used.

The rotary encoder 130 is provided in a crank mechanism (not shown in the figure), and detects an angle signal of the crank (hereinafter, referred to as crank angle signal).

The blow-by detection unit 132 is provided in an exhaust passage that is in communication with the exhaust port 116. The blow-by detection unit 132 detects an amount of the fuel gas injected from the fuel injection valves 128 that is exhausted from the exhaust port 116 unburned without remaining in the combustion chamber (an amount of blow-by). The blow-by detection unit 132 detects a concentration of carbon hydrides (hydrocarbons) exhausted from the cylinder 110, to thereby detect an amount of blow-by of the fuel gas from the exhaust port 116. On detecting the amount of blow-by, the blow-by detection unit 132 outputs a blow-by detection signal indicative of the amount of blow-by to the fuel injection control unit 152.

Based on an engine output instruction value that has been input from an upper-level control device and on the number of revolution of the engine that is specified by the crank angle signal from the rotary encoder 130, the governor 150 derives an amount of fuel injection and then outputs the amount to the fuel injection control unit 152.

Based on the information indicative of the amount of fuel injection that has been input from the governor 150, on the crank angle signal from the rotary encoder 130, and on the blow-by detection signal, the fuel injection control unit 152 controls the fuel injection valves 128 by means of a control signal. In the present embodiment, the fuel injection control unit 152 functions also as a load determination unit. Based on the information indicative of the amount of fuel injection that has been input from the governor 150, the fuel injection control unit 152 determines whether the uniflow-scavenging-type two-cycle engine 100 is in a high-load state or in a low-load state.

Based on the information indicative of the amount of fuel injection from the fuel injection control unit 152 and on the crank angle signal from the rotary encoder 130, the exhaust control unit 154 outputs an exhaust valve operation signal to the exhaust valve drive device 118. Hereunder is a description of the operation of each control unit in the engine cycle of the uniflow-scavenging-type two-cycle engine 100.

Figure 2:
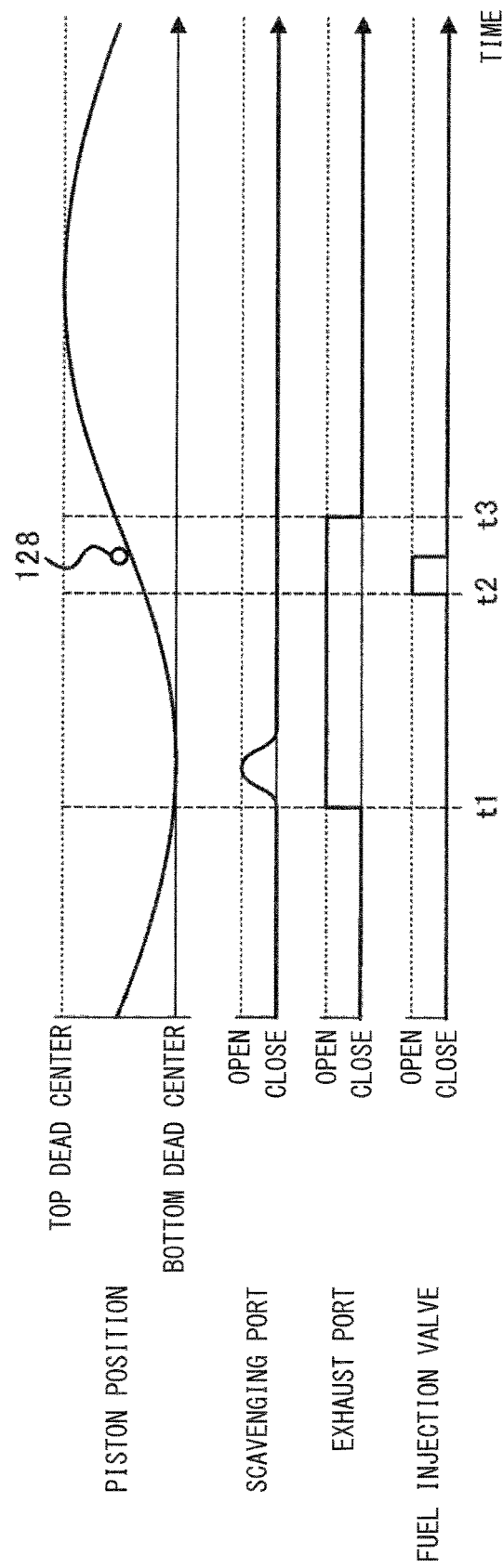
FIG. 2 is an explanatory diagram showing an operation of each control unit.

FIG. 2 is an explanatory diagram showing a operation of each control unit. As shown in FIG. 2, in the exhaust process after the combustion process, the exhaust port 116 and the scavenging ports 122 are in a closed state, and the combustion chamber 140 (cylinder 110) is filled with an exhaust gas.

When the piston 112 is lowered to be brought close to the bottom dead center due to an explosive pressure produced by the combustion action in the combustion chamber 140, the exhaust control unit 154 opens the exhaust valve 120 via the exhaust valve drive device 118. At the same time, following the sliding movement of the piston 112, the scavenging ports 122 open (t1 shown in FIG. 2). As a result, an active gas is drawn in from the scavenging ports 122, and the active gas moves up while forming a swirl (swirling flow) for promoting a mixture of the fuel gas. This causes the exhaust gas in the combustion chamber 140 (cylinder 110) to be pushed out from the exhaust port 116.

In the compression process in which the piston 112 moves up from the bottom dead center toward the top dead center, the scavenging ports 122 are closed to stop the intake of the active gas. At this time the exhaust control unit 154 keeps the exhaust valve 120 in an open state. Therefore, with an upward movement of the piston 112, the exhaust gas in the combustion chamber 140 (cylinder 110) continues to be exhausted from the exhaust port 116. In this period of time, based on the information indicative of the amount of fuel injection that has been input from the governor 150, on the number of revolution of the engine that has been derived from the crank angle signal from the rotary encoder 130, and on other factors, the fuel injection control unit 152 causes a fuel gas to be injected from the fuel injection valves 128 into the cylinder 110 when the piston 112 is closer to the bottom dead center than the fuel injection valves 128 (t2 shown in FIG. 2).

As a result, the fuel gas is injected to the active gas drawn in from the scavenging ports 122, which generates a premixed gas in the combustion chamber 140 (cylinder 110).

After that, when the piston 112 further moves up to be closer to the top dead center than the fuel injection valves 128, the exhaust control unit 154 closes the exhaust valve 120 to close the exhaust port 116 (t3 shown in FIG. 2).

Thus, with the premixed gas burning in the combustion chamber 140, the processes of exhaust, intake (induction), compression, combustion, and expansion are repeated. Although it depends on the operational situation of the engine, but for example, if the fuel gas is injected locally when the engine is in a high-load state, there may be knocking or preignition in some cases, resulting in possible lowering of the operational performance. On the other hand, if the fuel injection valves 128 are configured so as to always cause the fuel gas to be spread widely over the whole internal area of the cylinder 110 (combustion chamber 140), then there is a possibility that the fuel gas does not burn when the engine is in a low-load state. Therefore, in the present embodiment, the fuel injection valves 128 are configured as follows in order to inject the fuel gas to appropriate sites in accordance with the operational situation.

Figure 3A:
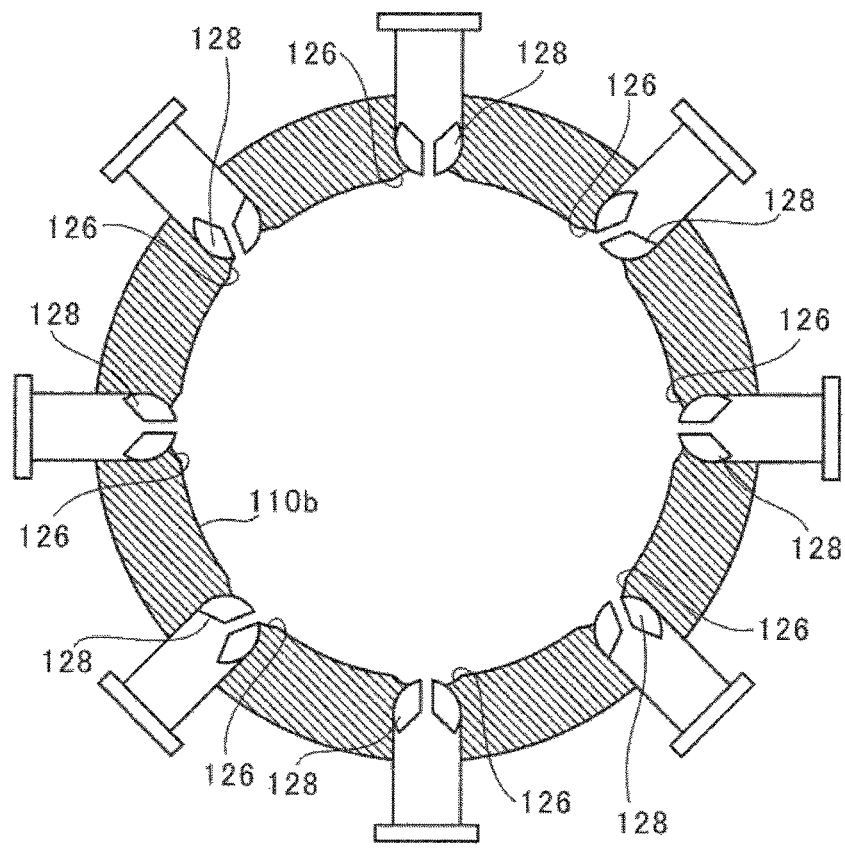
FIG. 3A is a diagram for explaining fuel injection valves.
Figure 3B:
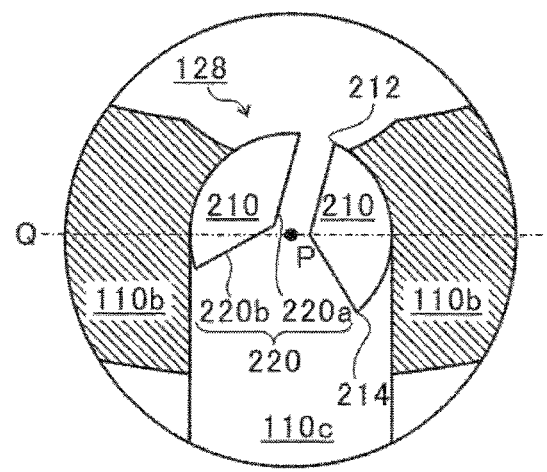
FIG. 3B is an enlarged view for explaining a fuel injection valve.
Figure 3C:
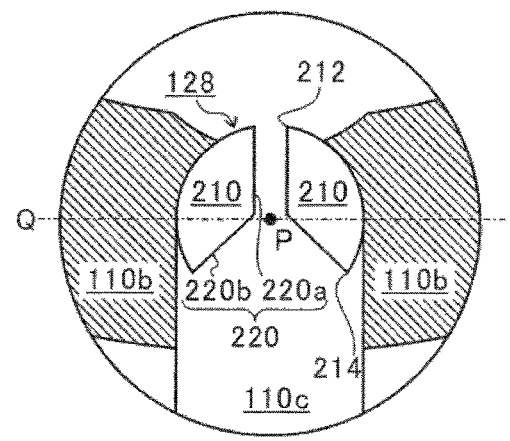
FIG. 3C is an enlarged view for explaining the fuel injection valve.

FIG. 3A, FIG. 3B, and FIG. 3C are diagrams for explaining the fuel injection valve(s) 128. FIG. 3A shows a horizontal cross-section of the cylinder 110, taken at a position where the fuel injection ports 126 are formed. FIG. 3B and FIG. 3C are enlarged views of part of a fuel injection valve 128 in FIG. 3A.

As shown in FIG. 3A, the uniflow-scavenging-type two-cycle engine 100 of the present embodiment has the cylinder 110 in which the eight fuel injection ports 126 are formed. Each of the fuel injection ports 126 is provided with the fuel injection valve 128.

In the present embodiment, the fuel injection valves 128 are capable of varying injection directions of the fuel gas in accordance with the control signal that has been output from the fuel injection control unit 152.

To give a more specific description, as shown in FIG. 3B and FIG. 3C, the fuel injection valve 128 includes: a main unit 210 that maintains such a dimensional relationship as to be substantially the same as a diameter of a flow passage 110c formed between cylinder blocks 110b through which the fuel gas flows and that also rotates about two axes of an axis P and an axis Q; an injection outlet 212 provided at a first end of the main unit 210; a feed inlet 214 that is formed at a second end of the main unit 210 and has a diameter larger than that of the injection outlet 212; and a through-hole 220 that connects between the injection outlet 212 and the feed inlet 214 and that also passes between the main unit 210. The through-hole 220 is made of: a directional section 220a that is continuous from the injection outlet 212 and also has a diameter substantially the same as that of the injection outlet 212; and a connection section 220b that connects between the directional section 220a and the feed inlet 214.

On receiving the control signal that has been output from the fuel injection control unit 152, a drive unit (not shown in the figure) controls the rotation of the main unit 210 of the fuel injection valve 128, to thereby control the fuel injection valve 128 to switch between a first state shown in FIG. 3B and a second state shown in FIG. 3C.

Figure 4:
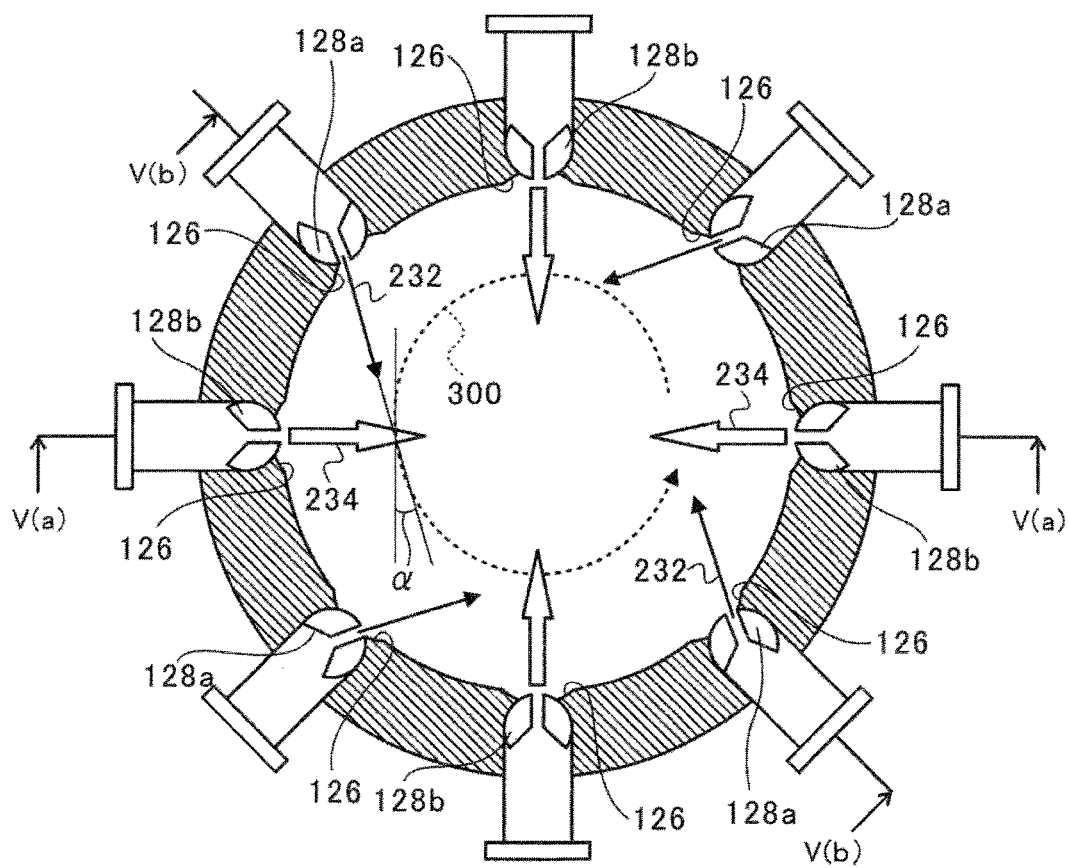
FIG. 4 is a diagram for explaining the directions in which a fuel gas is injected.
Figure 5A:
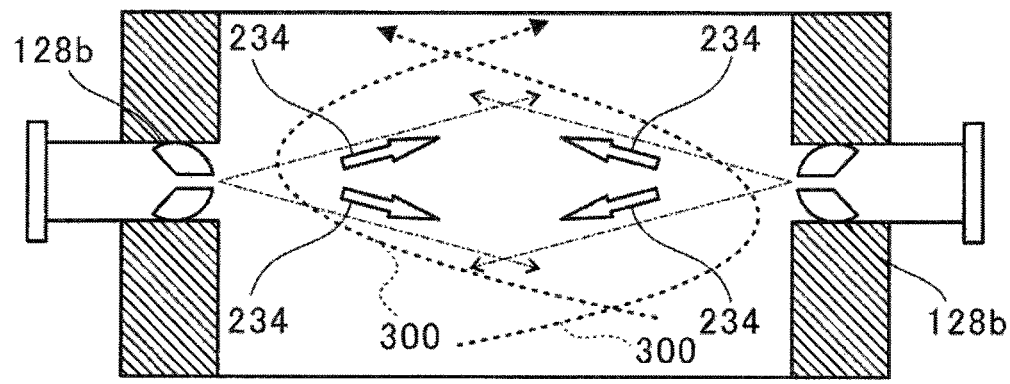
FIG. 5A is a vertical cross-sectional view of a cylinder, taken at a position where fuel injection ports are formed.
Figure 5B:
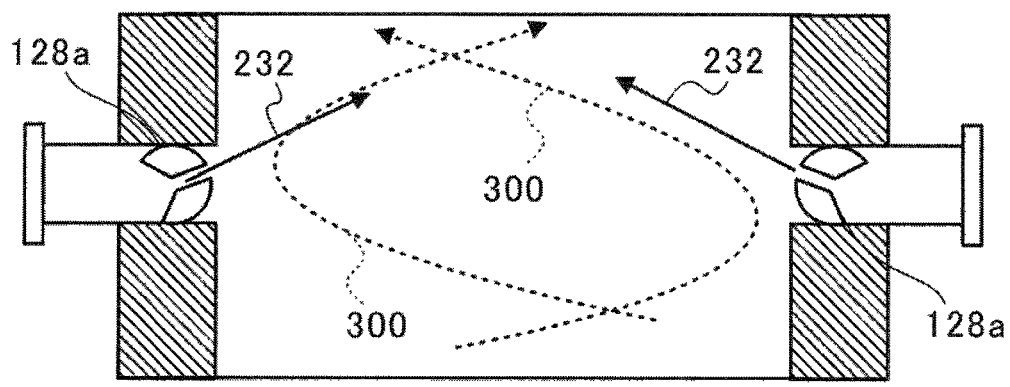
FIG. 5B is a vertical cross-sectional view of a cylinder, taken at a position where the fuel injection ports are formed.
Figure 5C:
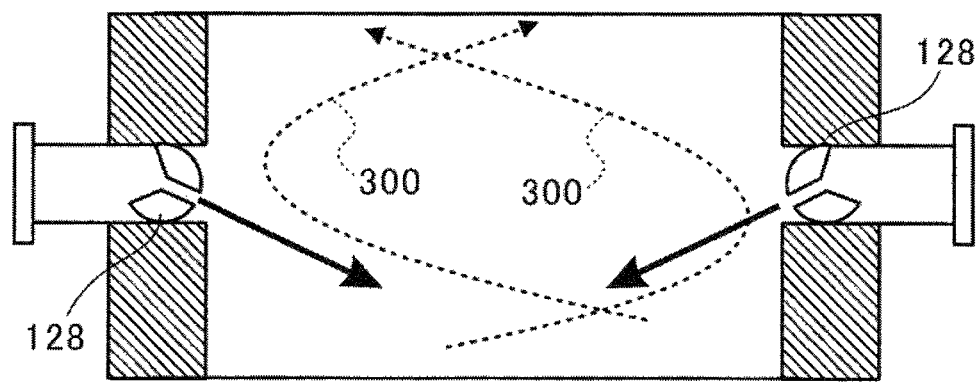
FIG. 5C is a vertical cross-sectional view of a cylinder, taken at a position where the fuel injection ports are formed.

FIG. 4 is a diagram for explaining injection directions of the fuel gas. It shows a horizontal cross-section of the cylinder 110, taken at a position where the fuel injection ports 126 are formed. FIG. 5A, FIG. 5B, and FIG. 5C are vertical cross-sectional diagrams of the cylinder 110, taken at a position where the fuel injection ports 126 are formed. FIG. 5A shows a cross-section of FIG. 4, taken along the V(a)-V(a) line. FIG. 5B is a cross-section of FIG. 4, taken along the V(b)-V(b) line. FIG. 5C shows a cross-section in the case of controlling the fuel injection valves 128 based on the blow-by detection signal that has been output from the blow-by detection unit 132.

In FIG. 4, the fuel injection valves 128 that are disposed in the aforementioned first state are denoted with reference symbol 128a while the fuel injection valves 128 disposed in the aforementioned second state are denoted with reference symbol 128b.

In the case where the main unit 210 is rotated in response to the control signal from the fuel injection control unit 152, to thereby dispose the fuel injection valves 128a in the first state, namely, in the case where a central line of each through-hole 220 is disposed in a direction that intersects an extension direction of each flow passage 110c (see FIG. 3B), the fuel gas is injected in directions (first directions, directions of solid-line arrows denoted with reference symbol 232 in FIG. 4) along a swirl or a swirling flow (a broken-line arrow denoted with reference symbol 300 in FIG. 4) of the active gas drawn in into the cylinder 110 (combustion chamber 140).

On the other hand, in the case where the main unit 210 is rotated in response to the control signal from the fuel injection control unit 152, to thereby dispose the fuel injection valves 128b in the second state, namely, in the case where the central line of each through-hole 220 is disposed in a direction along the extension direction of each flow passage 110c (see FIG. 3C), the fuel gas is injected in directions closer to the central line of the cylinder 110 than those of the fuel gas from the fuel injection valves 128a in the first state (second directions, in the present embodiment, to the central line of the cylinder 110; directions of hollow arrows denoted with reference symbol 234 in FIG. 4).

Here, the "direction along the swirling flow (swirl) of the active gas" is not limited to the case where the flow direction of the active gas completely coincides with the injection direction of the fuel gas. It is permissible if only the relationship is provided in which the fuel gas smoothly moves into the flow of the active gas. To be more specific, it is permissible if only the angle α (see FIG. 4) formed between the direction of the swirling flow of the active gas (flow direction) and the injection direction of the fuel gas in the horizontal cross-section of the cylinder 110 is 0°<α<90°. In this case, it is permissible if only the fuel gas injected from the fuel injection valve 128b in the second state is directed closer to the central axis of the cylinder 110 than the fuel gas injected from the fuel injection valve 128a in the first state.

Here, the fuel injection valves 128b inject the fuel gas toward the central axis of the cylinder 110 in the horizontal direction, as shown in FIG. 5A. The fuel injection valves 128a inject the fuel gas toward a direction vertically upper than the horizontal direction, as shown in FIG. 5B. However, a vertical injection angle of the fuel gas injected from the fuel injection valve 128a and that of the fuel gas injected from the fuel injection valve 128b may be appropriately set. Therefore, for example, the fuel gas may be injected from the fuel injection valve 128a in the horizontal direction, and the fuel gas may be injected from the fuel injection valve 128b toward a direction vertically upper than the horizontal direction.

As will be described in detail later, based on the blow-by detection signal that has been output from the blow-by detection unit 132, the fuel may be injected from the fuel injection valves 128 in directions vertically lower than the horizontal direction (in directions closer to the scavenging ports 122) as shown in FIG. 5C.

Thus, the fuel injection valve 128 is switchable between the first state and the second state by the fuel injection control unit 152. Namely, with the directions in which the fuel gas injected from the fuel injection valves 128 being made variable, it is possible to inject the fuel gas to appropriate sites in accordance with the operational situation of the uniflow-scavenging-type two-cycle engine 100.

For example, if the uniflow-scavenging-type two-cycle engine 100 is determined to be in the high-load state, then the fuel injection control unit 152 controls the rotation of the fuel injection valves 128 into the first state. As a result, the fuel injection valves 128 inject the fuel gas in the directions along the swirl of the active gas drawn in into the cylinder 110 (combustion chamber 140). This makes it possible to spread the fuel gas widely over the whole internal area of the cylinder 110 (combustion chamber 140). Therefore, compared with the conventional ones, it is possible to improve the operational performance.

On the other hand, if the uniflow-scavenging-type two-cycle engine 100 is determined to be in the low-load state, the fuel injection control unit 152 controls the rotation of the fuel injection valves 128 into the second state. As a result, the fuel injection valves 128 inject the fuel gas toward the central axis of the cylinder 110. This makes it possible to intentionally produce an area where the concentration of the fuel gas is high in the cylinder 110, to thereby make it possible to securely obtain the combustion action.

Figure 6A:
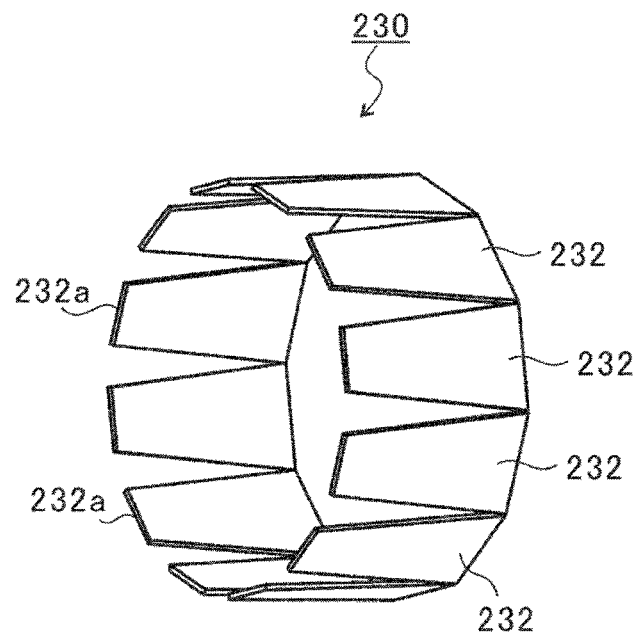
FIG. 6A is a diagram for explaining a specific example of flow passage adjusting mechanism.
Figure 6B:
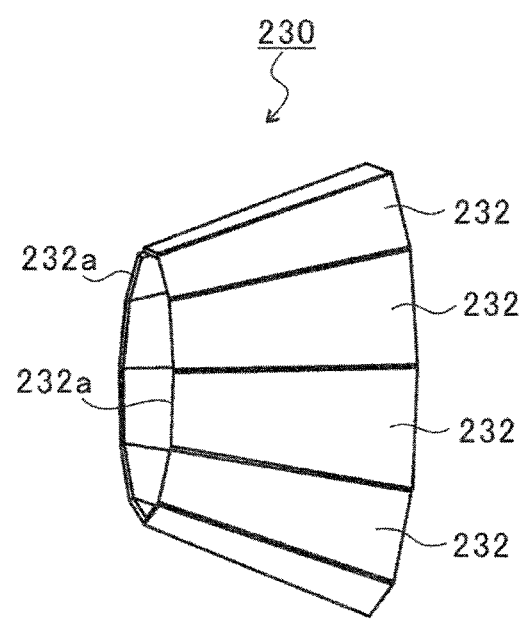
FIG. 6B is a diagram for explaining the specific example of flow passage adjusting mechanism.

Furthermore, the fuel injection valve 128 is provided with a flow passage adjusting mechanism 230. FIG. 6A and FIG. 6B are diagrams for explaining a specific example of flow passage adjusting mechanism 230. The flow passage adjusting mechanism 230 is provided at the injection outlet 212. As shown in FIG. 6A and FIG. 6B, the flow passage adjusting mechanism 230 is made of, for example, 12 movable pieces 232. The flow passage adjusting mechanism 230 makes a cross-sectional area of flow passage largest in a first state as shown in FIG. 6A. From the first state, the movable pieces 232 are moved so as to bring front ends 232a into contact with each other, namely, so as to dispose the front ends 232a inside the flow passage adjusting mechanism 230. This shifts the flow passage adjusting mechanism 230 to a second state as shown in FIG. 6B. In the second state, it is possible to make the cross-sectional area of flow passage smaller than the case of the first state. Thus, the flow passage adjusting mechanism 230 is capable of making the cross-sectional area of flow passage of the through-hole 220 variable. The flow passage adjusting mechanism 230 may be provided not only at the injection outlet 212 but instead somewhere in a flow passage from the feed inlet 214 (internal area of the fuel injection valve 128) to the injection outlet 212 of the through-hole 220 (directional section 220a, connection section 220b) through which the fuel gas flows. With the flow passage adjusting mechanism 230 being provided, it is possible to adjust the flow rate of the fuel gas that is injected from the injection outlet 212 of the fuel injection valve 128 into the cylinder 110.

It is permissible if only the flow passage adjusting mechanism of the fuel injection valve 128 is capable of injecting the fuel gas at a desired flow rate, and its structure is not limited to that of the aforementioned flow passage adjusting mechanism 230. For example, a plurality of directional sections 220a may be independently provided, and a mechanism of opening and closing the directional sections 220a may be used as a flow rate adjusting mechanism. Through controlling the number of the directional sections 220a that are set in a closed state or in an open state, the cross-sectional area of flow passage of the through-hole 220 may be made variable.

Figure 7:
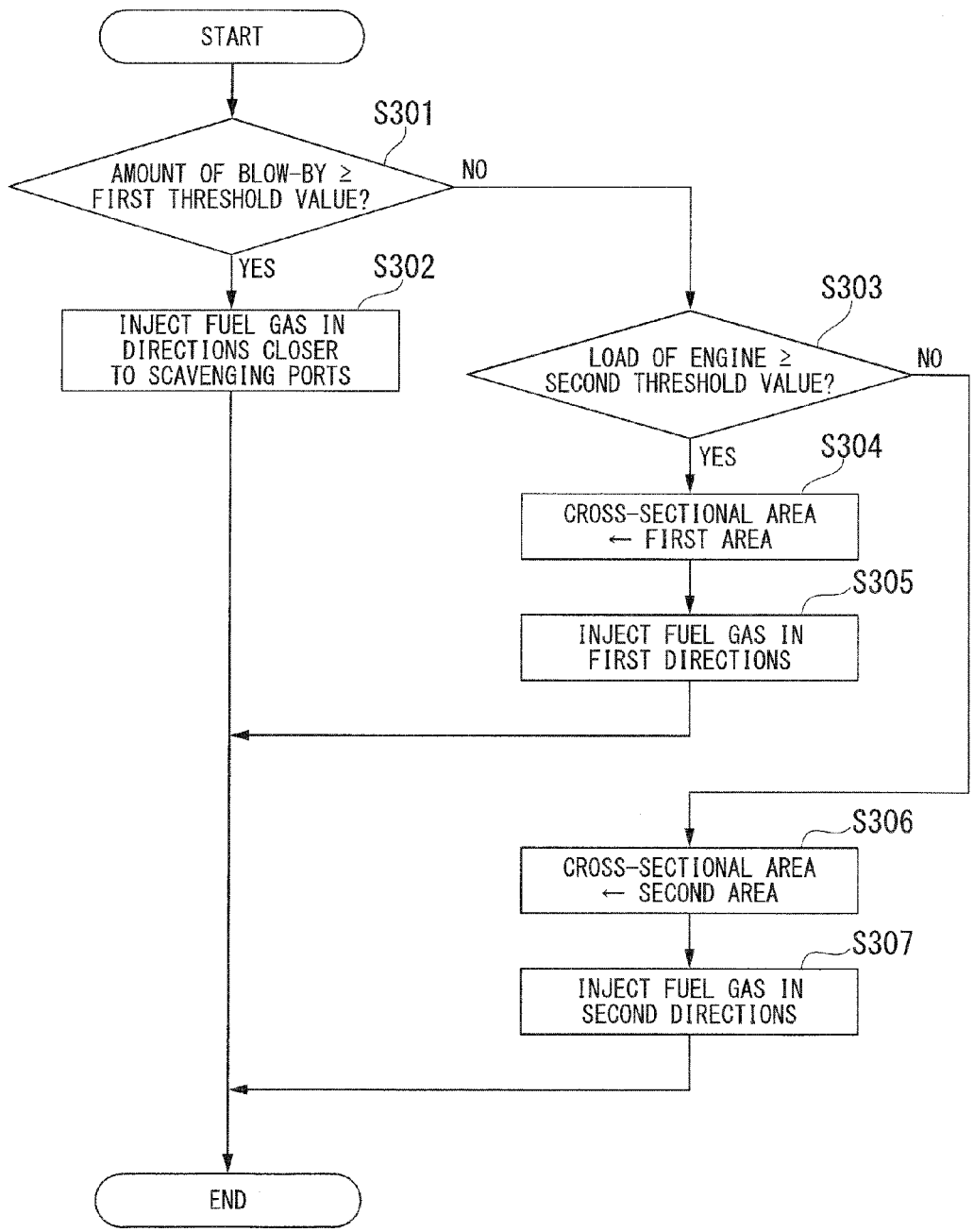
FIG. 7 is a flow chart for explaining an exemplary control method of the fuel injection valve by a fuel injection control unit.

Subsequently, a control method of the fuel injection valves 128 by the fuel injection control unit 152 will be described. FIG. 7 is a flow chart showing an example of control method of the fuel injection valves 128 by the fuel injection control unit 152. The processing shown in FIG. 7 starts when, for example, the aforementioned information indicative of the amount of fuel injection is input from the governor 150 to the fuel injection control unit 152.
(Step S301)

When the information indicative of the amount of fuel injection is input from the governor 150, the fuel injection control unit 152 determines whether or not the amount of blow-by of the fuel gas indicated by the blow-by detection signal input from the blow-by detection unit 132 is not less than a preset first threshold value. If the amount of blow-by of the fuel gas is not less than the first threshold value (Yes in Step S301), then the process moves to Step S302. If the amount of blow-by of the fuel gas is less than the first threshold value (No in Step S301), then the process moves to Step S303.
(Step S302)

If the amount of blow-by of the fuel gas is not less than the first threshold value (Yes in Step S301), then the fuel injection control unit 152 controls the fuel injection valves 128 to turn the injection directions of the fuel gas to directions closer to the scavenging ports 122 in the stroke direction of the piston 112 than the case where the amount of blow-by of the fuel gas is less than the first threshold value (than the case where the blow-by of the fuel gas is not detected).

As described above, because the exhaust port 116 is still open when the fuel is injected from the fuel injection valves 128 (see FIG. 2), a blow-by of the fuel gas may be produced according to how the gas in the cylinder 110 flows, and a part of the fuel injected from the fuel injection valves 128 may be exhausted as it is from the exhaust port 116. Therefore, if the blow-by detection unit 132 detects a blow-by (if the amount of blow-by of the fuel gas is not less than the first threshold value), then the injection directions of the fuel gas by the fuel injection valves 128 are turned to directions closer to the scavenging ports 122 in the stroke direction of the piston 112 than the case where a blow-by of the fuel gas is not detected, to thereby make it possible to decrease the amount of blow-by of the fuel gas from the exhaust port 116.
(Step S303)

If the amount of blow-by of the fuel gas is less than the first threshold value (No in Step S301), then the fuel injection control unit 152 functions as a load determination unit, and determines whether the load state of the uniflow-scavenging-type two-cycle engine 100 is the high-load state or not based on the info nation indicative of the amount of fuel injection that has been input from the governor 150. To give a specific description, the fuel injection control unit 152 determines whether or not a load of the uniflow-scavenging-type two-cycle engine 100 is not less than a preset second threshold value. If the load of the uniflow-scavenging-type two-cycle engine 100 is not less than the preset second threshold value (Yes in Step S303), then the load state of the uniflow-scavenging-type two-cycle engine 100 is determined to be the high-load state, and the process moves to Step S304. On the other hand, if the load of the uniflow-scavenging-type two-cycle engine 100 is less than the preset second threshold value (No in Step S303), then the load state of the uniflow-scavenging-type two-cycle engine 100 is determined to be the low-load state, and the process moves to Step S306.
(Step S304)

If the load state of the uniflow-scavenging-type two-cycle engine 100 is the high-load state (Yes in Step S303), then the fuel injection control unit 152 controls the flow passage adjusting mechanisms of the fuel injection valves 128 to set the cross-sectional area of flow passage of the through-hole 220 in each fuel injection valve 128 to a preset first area.
(Step S305)

Then, the fuel injection control unit 152 controls the fuel injection valves 128 to turn the injection directions of the fuel gas to first directions (directions along the swirl flow of the active gas drawn in into the cylinder 110).
(Step S306)

On the other hand, if the load state of the uniflow-scavenging-type two-cycle engine 100 is the low-load state (No in Step S303), then the fuel injection control unit 152 controls the flow passage adjusting mechanisms of the fuel injection valves 128 to alter the cross-sectional area of flow passage of the through-hole 220 in each fuel injection valve 128 to a second area that is smaller than the preset first area.
(Step S307)

Then, the fuel injection control unit 152 controls the fuel injection valves 128 to turn the injection directions of the fuel gas to second directions (directions closer to the central axis of the cylinder 110 than the first directions.

According to the aforementioned processing, if the uniflow-scavenging-type two-cycle engine 100 is in the high-load state, then the cross-sectional area of flow passage of the through-hole 220 in each fuel injection valve 128 is set to the relatively larger first area. Thereby, if the uniflow-scavenging-type two-cycle engine 100 is in the high-load state in which consumption of the fuel gas is relatively high, then it is possible to inject more fuel gas into the cylinder 110.

Furthermore, if the uniflow-scavenging-type two-cycle engine 100 is in the high-load state, then the fuel injection control unit 152 sets the injection directions of the fuel gas by the fuel injection valves 128 to the first directions, to thereby make it possible to spread the fuel gas over the whole internal area of the cylinder 110. As a result, in the case where a large quantity of fuel gas is injected, the possibility of making the concentration of the fuel gas locally too high in the cylinder 110 is reduced. Therefore, irrespective of the operational situation of the engine, it is possible to avoid abnormal combustion and make a normal operation available.

If the uniflow-scavenging-type two-cycle engine 100 is in the low-load state, then the cross-sectional area of flow passage of the through-hole 220 in each fuel injection valve 128 is set to the relatively smaller second area. As a result, in the case of the low-load state where consumption of the fuel gas is relatively small, it is possible to powerfully inject a small quantity of fuel gas into the cylinder 110.

Furthermore, if the uniflow-scavenging-type two-cycle engine 100 is in the low-load state, then the fuel injection control unit 152 sets the injection directions of the fuel gas by the fuel injection valves 128 to the second directions. As a result, in the vicinity of the center of the cylinder 110, the fuel gases injected from the fuel injection valves 128 are caused to powerfully collide against one another. This makes it possible to intentionally produce area(s) where the concentration of the fuel gas is high, to thereby make it possible to securely obtain the combustion action.

While a preferred embodiment of the present invention has been described with reference to the appended drawings, the present invention is not limited to this embodiment. It is obvious that those skilled in the art can conceive a variety of modifications and alterations within the range described in the claims. Therefore, it should be understood that those modifications and alterations belong to the technical scope of the present invention.

For example, in the aforementioned embodiment, the description has been for the case where the fuel injection control unit 152 functions as a load determination unit, by way of example. In a modification, different functional units may be used as the fuel injection control unit 152 and the load determination unit.

In the aforementioned embodiment, the description has been for the structure where, if the uniflow-scavenging-type two-cycle engine 100 is in the high-load state, the fuel injection control unit 152 sets the injection directions of the fuel gas by the fuel injection valves 128 to the first directions. However, if the uniflow-scavenging-type two-cycle engine 100 is in the high-load state, the fuel injection control unit 152 may control the fuel injection valves 128 to set the injection directions of the fuel gas of some of the fuel injection valves 128 out of all the fuel injection valves 128 to the first directions, and to set the injection directions of the fuel gas of the other fuel injection valves 128 to the second directions. As a result, it is possible to more uniformly spread the fuel gas over the whole internal area of the cylinder 110. In this case, the fuel injection valves 128a, which inject the fuel gas in the first directions, and the fuel injection valves 128b, which inject the fuel gas in the second directions, may be alternately disposed. Therefore, even if the fuel gas is injected simultaneously from all the fuel injection valves 128, the fuel gases injected from the adjacent fuel injection valves 128 are unlikely to interfere with each other. This makes it possible to spread the fuel gas more widely over the whole internal area of the cylinder 110 (combustion chamber 140).

Furthermore, in the aforementioned embodiment, the description has been for the case of the fuel injection valves 128 with the structure as shown in FIG. 3A, FIG. 3B, and FIG. 3C, by way of example. It is permissible if only the fuel injection valve 128 is capable of injecting the fuel gas in a desired direction, and a specific structure thereof may be appropriately designed.

In the aforementioned embodiment, the number of the first fuel injection valves 128a and the number of the second fuel injection valves 128b are the same. However, the number of the first fuel injection valves 128a and the number of the second fuel injection valves 128b may be different. Furthermore, their arrangement is not particularly limited.

In the aforementioned embodiment, the description has been for the structure where the fuel injection valve 128 is provided with a flow passage adjusting mechanism. However, the flow passage adjusting mechanism is not necessarily required.

INDUSTRIAL APPLICABILITY

The present invention can be utilized as a uniflow-scavenging-type two-cycle engine that burns a premixed gas generated by injecting a fuel gas to an active gas drawn in from scavenging ports. Furthermore, with the structures of fuel injection valves being modified, it is possible to spread the fuel gas widely over the whole internal area of the cylinder, to thereby make it possible to further improve the operational performance.

DESCRIPTION OF REFERENCE SIGNS

100: uniflow-scavenging-type two-cycle engine
110: cylinder
112: piston
116: exhaust port
120: exhaust valve
122: scavenging port
128: fuel injection valve
132: blow-by detection unit
152: fuel injection control unit (load determination unit)

The invention claimed is:

1. A uniflow-scavenging-type two-cycle engine, comprising:
a cylinder in which a combustion chamber is formed;
a piston that slides in the cylinder;
an exhaust port that is provided at a first end of the cylinder in a stroke direction of the piston;
an exhaust valve that opens and closes the exhaust port;
a scavenging port that is provided in an inner circumferential surface of a second end of the cylinder in the stroke direction of the piston and inhales an active gas into the combustion chamber in accordance with a sliding movement of the piston;
a plurality of fuel injection valves, wherein each fuel injection valve includes an injection outlet provided between a top dead center and a bottom dead center of the piston in the cylinder, and the plurality of fuel injection valves inject a fuel gas to the active gas, which has been drawn in from the scavenging port to the combustion chamber, via the injection outlets, to thereby generate a premixed gas;
a fuel injection control unit that varies injection directions of fuel gas injected from a part or all of the fuel injection valves; and
a load determination unit that determines whether the uniflow-scavenging-type two-cycle engine is in a high-load state or in a low-load state,
wherein if a load state detected by the load determination unit is the high-load state, then the fuel injection control unit turns the injection directions of the fuel gas to first directions, which are directions along a swirl flow of the active gas drawn in into the cylinder; and if a load state detected by the load determination unit is the low-load state, then the fuel injection control unit turns the injection directions of the fuel gas to second directions, which are directions closer to a central axis of the cylinder than the first directions.

2. The uniflow-scavenging-type two-cycle engine according to claim 1, further comprising:
a blow-by detection unit that detects an amount of blow-by of the fuel gas from the exhaust port,
wherein if the amount of blow-by of the fuel gas detected by the blow-by detection unit is not less than a threshold value, then fuel injection control unit turns the injection directions of the fuel gas to directions closer to the scavenging port in the stroke direction of the piston than if the amount of blow-by of the fuel gas is less than the threshold value.

3. The uniflow-scavenging-type two-cycle engine according to claim 1,
wherein, as for the fuel injection valves, a cross-sectional area of flow passage is variable somewhere in a flow passage from an internal area of the fuel injection valve to the injection outlet through which the fuel gas flows.

4. The uniflow-scavenging-type two-cycle engine according to claim 2,
wherein, as for the fuel injection valves, a cross-sectional area of flow passage is variable somewhere in a flow passage from an internal area of the fuel injection valve to the injection outlet through which the fuel gas flows.

\* \* \* \* \*